United States Patent
Nowlin, Jr. et al.

(10) Patent No.: US 6,518,726 B1
(45) Date of Patent: Feb. 11, 2003

(54) BATTERY CHARGER AND CHARGE CONTROL SYSTEM

(75) Inventors: Ronald D. Nowlin, Jr., Riverton, KS (US); Heath Throneberry, Hermann, MO (US); Donnie M. McCorkle, Galena, KS (US); Steven E. Hathaway, Overland Park, KS (US)

(73) Assignee: Eagle-Picher Technologies, L.L.C., Joplin, MO (US)

( * ) Notice: Subject to any disclaimer, the term of this patent is extended or adjusted under 35 U.S.C. 154(b) by 0 days.

(21) Appl. No.: 10/051,402

(22) Filed: Jan. 18, 2002

(51) Int. Cl.[7] .................................................. H02J 7/00
(52) U.S. Cl. ..................................................... 320/128
(58) Field of Search ................................. 320/106, 128, 320/127, 136, 150

(56) References Cited

U.S. PATENT DOCUMENTS

| | | | |
|---|---|---|---|
| 5,432,429 A | 7/1995 | Armstrong, II et al. | 320/136 |
| 5,767,659 A | 6/1998 | Farley | 320/106 |
| 5,831,350 A | 11/1998 | McConkey et al. | 307/150 |
| 5,898,294 A | 4/1999 | Gold | 320/139 |
| 5,955,869 A | 9/1999 | Rathmann | 320/132 |
| 5,973,477 A | 10/1999 | Chang | 320/114 |
| 5,994,874 A | 11/1999 | Hirose | 320/125 |
| 6,025,698 A | 2/2000 | Kim et al. | 320/132 |
| 6,040,685 A * | 3/2000 | Tsenter et al. | 320/160 |
| 6,060,864 A | 5/2000 | Ito et al. | 320/136 |
| 6,118,254 A | 9/2000 | Faulk | 320/141 |
| 6,198,250 B1 * | 3/2001 | Gartstein et al. | 320/112 |
| 6,326,767 B1 * | 4/2001 | Small et al. | 320/150 |
| 6,377,028 B1 * | 4/2002 | Armstrong, II et al. | 320/136 |
| 6,403,251 B1 * | 6/2002 | Baggaley et al. | 320/127 |

* cited by examiner

Primary Examiner—Edward H. Tso
Assistant Examiner—Pia Tibbits
(74) Attorney, Agent, or Firm—Wood, Herron & Evans, L.L.P.

(57) ABSTRACT

A battery charger and charge control system charges series connected lithium-ion batteries to a voltage in the range of about 4.1 volts and about 4.3 volts per battery with a voltage input to the system in the range of about 4.1 to about 4.5 volts per battery. Switching efficiencies associated with the system allow the charging and charge control circuitry of the system to be positioned within the battery housing. The charging and charge control circuitry may mount onto a single circuit board. Morever, the battery charger and charge control system allows the lithium-ion batteries to simultaneously charge and discharge.

51 Claims, 3 Drawing Sheets

BATTERY CHARGER AND CHARGE CONTROL SYSTEM

FIELD OF THE INVENTION

The present invention relates generally to battery charging systems and, more particularly, to a charger and charge control system for charging batteries, such as lithium-ion batteries.

BACKGROUND OF THE INVENTION

Efficiency and power advantages inherent to lithium-ion batteries have promoted the development and use of such cells in a variety of applications, such as laptop computers. Yet, such progress has prompted greater demand for lithium-ion configurations that consume still less power and space. Consequently, efficiency considerations remain important to systems and industrial applications that utilize battery technologies.

Charge must be supplied to batteries in order for them to, in turn, power their respective loads. A percentage of the charge supplied to a conventional battery system is lost during the charging process. In some instances, heat dissipation accounts for such loss. That is, as current flows through a system, it interacts with resistive characteristics of system components and wiring and produces a voltage, some of which is released as heat. Consequently, it may be necessary to increase the amount of charge supplied to a conventional battery system in order to compensate for power losses. However, the required increased charge can translate into still greater heat generation and power inefficiency, thereby requiring sufficient heat dissipation components to prevent damage to the charging system and the batteries.

Such inefficiency can further impact size requirements of lithium-ion configurations. Namely, heat dissipation attributable to power propagation losses often in mandates that designers distance hardware components to avoid overheating. Elevated temperatures within a system compounds heat management by increasing the resistive properties of wiring and components comprising the circuitry of conventional systems. Thus, the conductive properties of circuitry is further lowered and still more heat is generated.

Absent steps to protect battery cells and other components from excessive heat, such as fans, heat sinks or physical spacing, system performance will suffer and hardware damage may result. Such provision includes circuit designers positioning either or both a charger and charge control circuit away from each other and outside of the pack containing the batteries. In this manner, heat stresses attributable to the charging and control functions are mitigated by their respective lack of proximity.

While this physical distance may lessen exposure of the circuitry to heat complications, the spacing requirement may result in complexities of its own. For example, the physical separation requirement often causes a lithium-ion configuration to be bulky and cumbersome. Accommodating such systems can inflate costs and complicate routine maintenance, such as battery replacement. Associated size requirements can further impede storage and render the circuitry vulnerable to jarring. Required spacing of components may additionally mandate increased costs associated with the design and manufacture of the system. Namely, such spacing can complicate circuit layouts and require additional circuitry needed to realize hardware separation.

Consequently, there is need for an improved charging system for charging lithium-ion battery systems.

SUMMARY OF THE INVENTION

The present invention overcomes the foregoing and other shortcomings and drawbacks of battery charger and charge control system and methods heretofore known. While the invention will be described in connection with certain embodiments, it will be understood that the invention is not limited to these embodiments. On the contrary, the invention includes all alternatives, modifications and equivalents as may be included within the spirit and scope of the present invention.

More particularly, the battery system achieves greater efficiencies and cell protection through the application of switchable transistors and monitoring methods. Charge control circuitry of the battery system measures voltage across each lithium-ion cell in order to sense a ceiling or basement threshold voltage. The circuitry may enable or disable one or more switchable transistors in response to detecting such a voltage extreme in a respective cell. Such action allows voltage to equalize as between the cells prior to resuming charging operations.

Similarly, the circuitry may monitor extreme temperatures proximate the cells and disconnect the cells from the charging circuitry in response to detecting an elevated temperature. As such, heat will dissipate and lower the temperature proximate the cells to a safe level before charging the lithium-ion cells resumes. The present invention further accounts for potentially low voltage scenarios in the lithium-ion cells by disconnecting them from a discharge device when a basement voltage extreme is detected. Such provision allows the charging circuitry time to raise the voltage of a critically low cell to a stable level. As with the above scenarios, the battery charger and charge control system resumes operations in response to sensing that the critical condition has been alleviated.

The above switching and heat efficiencies associated with the charger and charger control circuitry further allow them to mount within a common battery housing, facilitating more compact and robust implementation. To this end, the circuitry is preferably wired onto a common circuit board. As such, the charge and charger control circuitry work in concert to supply charge to the lithium-ion batteries. The configuration of the charger and charger control circuitry additionally accommodates simultaneous charging of the cells as they provide a load to a discharge device.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

DETAILED DESCRIPTION OF SPECIFIC EMBODIMENTS

Figure 1:
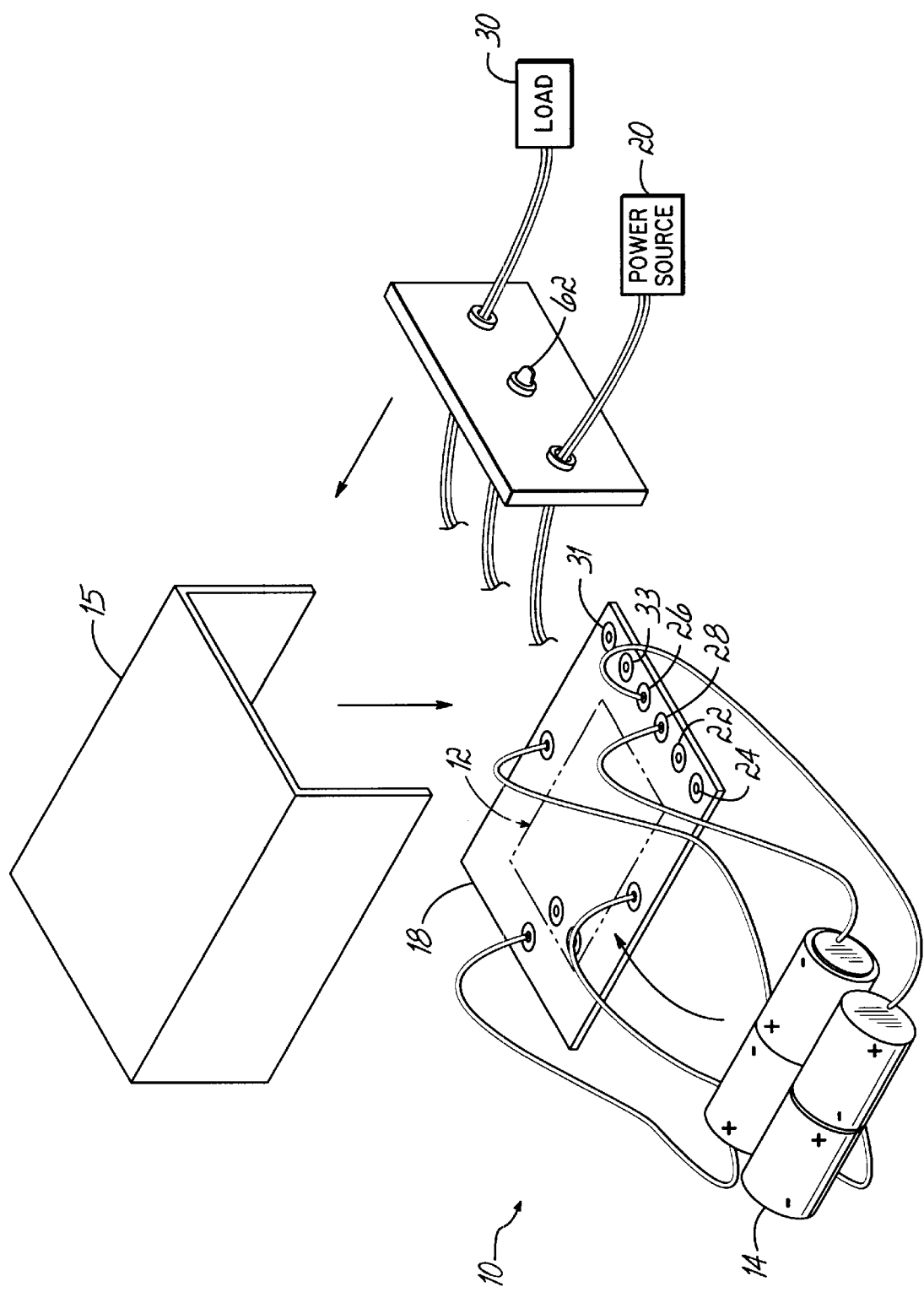
FIG. 1 illustrates a partially-assembled battery system that includes a battery charger and charging control system in accordance with the principles of the present invention.

With reference to the Figures, FIG. 1 shows a partially-assembled battery system 10 that includes a battery charger and charge control system 12 in accordance with the principles of the present invention. In one embodiment, the charger and charge control system 12 is configured to charge four series connected lithium-ion cells 14 accommodated within a battery housing 15. The battery charging and charge control system 12 preferably mounts onto a single printed circuit board 18. As such, the circuit board 18 fits within the battery housing 15 along with the lithium-ion cells 14. Such economizing of space can greatly simplify designs and cell replacement processes of systems incorporating the housing 15 by obviating obtrusive hardware spacing and connective requirements.

Figure 2:
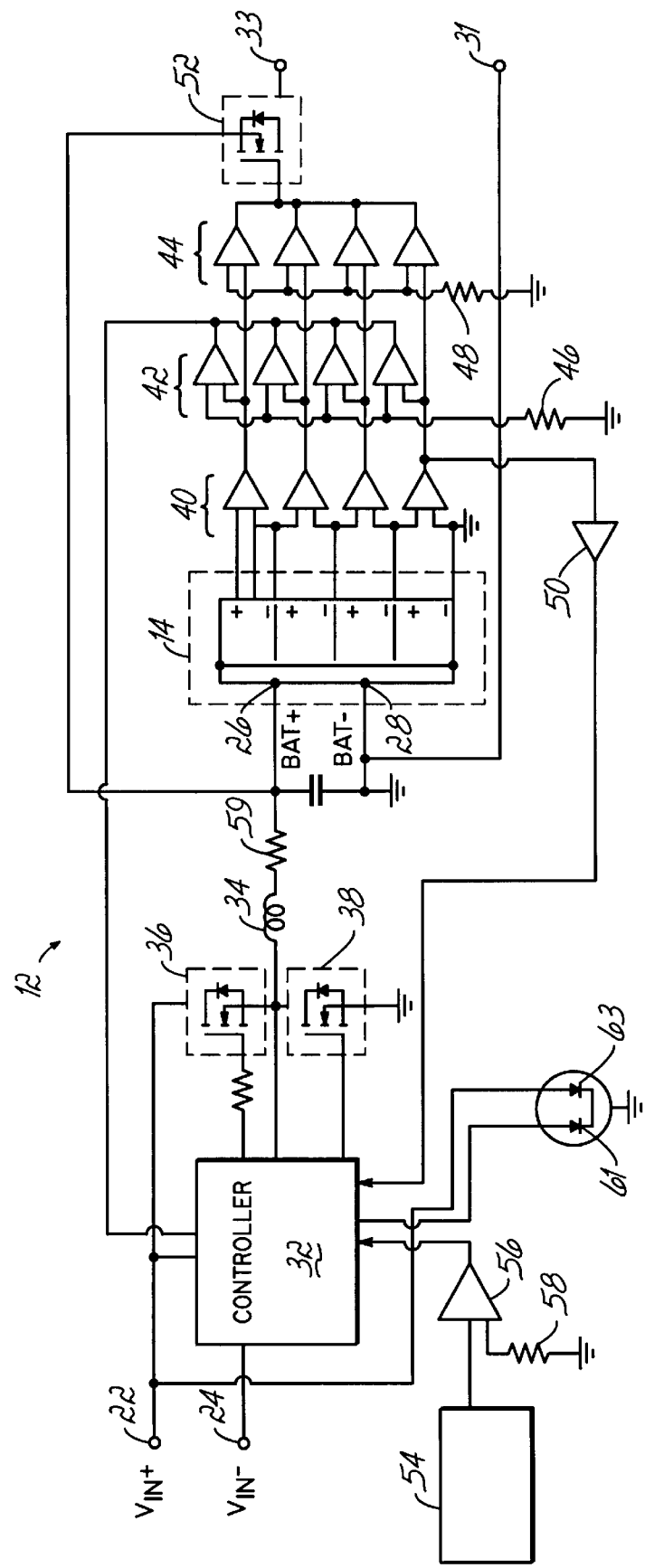
FIG. 2 illustrates circuitry of the battery charger and charging control system of FIG. 1.

In use, an external power supply 20 couples to the circuit board 18 and associated charger and charge control system 12 through the illustrated VIN+ and VIN− terminals 22, 24 as shown in FIGS. 1 and 2. The charger and charge control system 12 connects to the series connected lithium-ion cells 14 through BAT+ and BAT− terminals 26, 28. A load device 30 couples to the charger and charge control system 12 through the OUT+ and OUT− terminals 31, 33. As such, the charger and charge control system 12 may simultaneously charge the cells 14 as they discharge into the load device 30 being energized.

In operation, the charger and charge control system 12 initially provides constant current to the lithium-ion cells 14. In this manner, the cells 14 charge to a preset voltage level. Thereafter, the charger and charge control system 12 provides a constant voltage taper charge to the lithium-ion cells 14. The charger and charge control system 12 mounted on the circuit board 18 further monitors the voltage across each cell 14 and disconnects the lithium-ion cells 14 from either the input power supply 20 or the discharge device 30 being energized if any cell 14 in the series exceeds or falls below a preset ceiling or basement voltage limit, respectively.

The system 10 further communicates charge status to a user via an LED 62. In one embodiment, the LED 62 illuminates yellow when the cells 14 are charging, and turns green when the cells 14 approach full charge. As discussed below, efficiencies associated with the charger and charge control system 12 allow the system 12 to charge the lithium-ion cells 14 to a voltage in the range of about 4.1 volts to about 4.3 volts per battery cell with an input voltage supplied by the power source 20 in the range of about 4.1 to 4.5 V per cell 14 to the charger and charge control system 12. Of note, fall charge may be achieved using substantially smaller voltage levels than the exemplary 4.1 to 4.5 volt reference.

More particularly, the block diagram of FIG. 2 shows an exemplary layout for circuit charger and charge control components suited for incorporation into the system 10 of FIG. 1. The charger and charge control system 12 is operably configured to fully charge four lithium-ion cells 14 to a voltage in the range of about 4.1 volts to about 4.2 volts with a voltage input to the charger and charge control system 12 in the range of about 4.1 to 4.5 volts per cell 14. Generally, charge control circuitry interconnects and works in tandem with charging circuitry in such a manner as to control the amount of current and voltage supplied to and from the battery cells 14.

Turning more particularly to FIG. 2, a controller 32 monitors current and voltage supplied to and voltage across four, series-connected lithium-ion cells 14. During normal operation, the controller 32 brokers power supplied from the external source 20 to the lithium-ion cells 14 through input terminals 22, 24. The power source may comprise a direct current (DC) power source 20 that is external to a battery housing 15 and have an input voltage of about 16 to about 18 volts. As such, the controller 32 may receive, manipulate and deliver current from the input terminals 22, 24 to an inductor 34 via a set of switchable transistors 36, 38.

In response to the current, the inductor 34 creates an electromotive force that it supplies to the lithium-ion cells 14 through battery terminals 26, 28. The inductor 34 may be placed in series with the switchable transistors 36, 38 to smooth the current leaving the controller 32. The switchable transistors 36, 38, in part, serve to convert DC power supplied via the input terminals 22, 24 to alternating current (AC). The conversion facilitates system efficiency by mitigating power propagation losses associated with DC power.

The placement of the controller 32 along the current supply path from the power source input terminals 22, 24 to the lithium-ion cells 14 allows the controller 32 to manipulate the type and amount of power supplied to the cells 14. For instance, the controller 32 can readily enable or disable the switchable transistors 36, 38, which are configured to break or complete the supply circuit to the battery terminals 26, 28. By thus controlling the duty cycles of the switchable transistors 36, 38, the controller 32 manipulates the charge across the lithium-ion cells 14. As discussed below in greater detail, this measure of control further permits the charger and charge control system 12 to conduct simultaneous discharge and charging operations. As such, the controller 32 accounts for and coordinates requirements of both the load 30 and the power source 20.

To this end, the controller 32 monitors individual voltages of the lithium-ion cells 14 to account for high or low voltage conditions in each cell 14. As discussed below, a designer may specify basement and ceiling voltage parameters for each cell. Unheeded, such voltage extremes could result in damage to charger and charge control system 12 and cells 14, while harming system performance.

Subsequently, a bank of differential amplifiers 40 shown in FIG. 2 work in concert with a series of comparators 42, 44 to report individual cell voltages to the controller 32. Of note, differing ages, compositions and other characteristics of each lithium-ion cell 14 can cause them to charge and discharge at different rates. Consequently, one cell may reach or exceed a target voltage while the others continue to charge in parallel. Such a scenario could result in the cell exceeding a critical voltage level prior to the others reaching the target voltage, ultimately harming the cell and impeding system performance. For this reason, the differential amplifiers 40 are positioned such that they measure the voltage across each lithium-ion cell 14 relative to its placement within the charger and charge control system 12. Because the battery cells 14 are connected in series, each differential amplifier 40 connects to the top and bottom of respective cells 14 in order to detect the ceiling and basement voltage measurements associated with each cell 14.

As such, each differential amplifier 40 outputs a voltage value to an input prong of a comparator 42, 44 indicative of the respective cell 14. The comparator 42, 44 generates a binary signal in response to detecting that the voltage at one input prong is higher than at a second. At present, the input driven by one of the operational amplifiers 40 is compared to one of two reference voltages. As discussed herein, these reference voltages may include a basement and a ceiling voltage reference embodied by each bank of comparators 44, 42, respectively. The reference voltages may be electronically achieved using resistor configurations 46, 48 in parallel with the comparators 42, 44 as shown in FIG. 2.

More particularly, a prong of the first bank of comparators 42 may be correlated to a maximum voltage level or ceiling threshold voltage tolerated by a single lithium-ion cell 14 in a given charging scheme. That is, a charge exceeding the ceiling voltage may result in a cell 14 going critical and becoming damaged. While an operator may adjust the ceiling reference as appropriate to a particular application, the ceiling threshold voltage and comparator 42 inputs are preferably correlated to about 4.3 volts. The comparator 42 generates a binary signal that is conveyed back to the controller 32 in response to registering that the voltage sampled from a differential amplifier 40 exceeds the 4.3 volt ceiling reference threshold voltage. The binary signal from the comparator 42 communicates to the controller 32 that the voltage across the respective lithium-ion cell 14 has exceeded the specified ceiling threshold voltage. Absent such notification, the voltage in the cell 14 would continue to rise undetected, damaging the hardware and compromising system performance.

In response to the binary signal, the controller 32 intervenes by breaking the circuit between the input terminals 22, 24 and the lithium-ion cells 14. Namely, the controller 32 disables one of the switchable transistors 36 or 38 positioned between the controller 32 and the battery terminals 26, 28. This disconnect opens the circuit leading to the lithium-ion cells 14.

The absence of a charging current to the terminals 26, 28 allows voltage to equalize as between respective cells 14. In this manner, the charger and charge control system 12 continuously senses and corrects high voltage situations across each lithium-ion cell 14. This feature can dramatically increase both cell life and system performance. Efficiencies associated with the switching configuration 36, 38 further reduce the generation of heat, facilitating the common placement of both the charger and charge control system 12 within the battery housing 15.

Of note, the charger and charge control system 12 embodiment incorporates hysteresis principles to avoid oscillation within the charging regime. Such oscillation could result if an inadequate amount of time is allowed for cell 14 recovery in between charging applications. Namely, the voltage in a cell 14 may not have sufficient time to retreat to a voltage level that is low enough to ensure that a resumption of power to the cell 14 does not immediately cause its associated voltage to return to a critical state. Consequently, the embodiment may wait for the voltage in the cell to drop an additional 200 millivolts before re-engaging both switchable transistors 36, 38. This provision allows for more gradual recovery within the cells 14.

After the voltage in the critical lithium-ion cell 14 has dropped to about 4.1 volts, a comparator 50 sends a resume signal to the controller 32. More particularly, the differential amplifier 40 measuring the charge across the critical lithium-ion cell 14 will relate the charge to the comparator 50. The comparator 50 evaluates the charge against a hysterisis voltage hardwired into the comparator 50. A preferred hysterisis voltage may be set at around 4.1 volts. Accordingly, the controller 32 will receive the resume signal from the comparator 50 when the voltage measured across the lithium-ion cell 14 matches that of the hysterisis reference voltage.

This subsequent signal instructs the controller 32 to resume charging operations across all lithium-ion cells 14. As the respective charges across the cells 14 have equalized while the comparator 50 waited for voltage to drop in the critical cell 14, the intermittent power supply has effectively postured the cells 14 to charge more evenly. Such a charging regiment permits each lithium-ion cell 14 to achieve maximum capacity and extends cell longevity over time.

The charger and charge control system 12 shown in FIG. 2 additionally monitors and corrects low voltage conditions across each cell 14. Such conditions can arise at instances when the lithium-ion cells 14 provide charge to the load 30 at a rate faster than charge is replenished to the same. As above, differing characteristics of each lithium-ion cell 14 can give rise to varying rates of voltage discharge. Consequently, the differential amplifier combination 40 additionally detects and reports to the controller 32 measured incidences occurring below a basement threshold voltage.

More particularly, the differential amplifiers 40 measure the voltage across each lithium-ion cell 14 to detect a sub-critical condition. Such a condition can signal system failure and cell 14 damage. As above, the differential amplifiers 40 convey the voltage measurement to a respective bank of comparators 44. These comparators 42 are configured to evaluate the voltage measurement relative to the basement threshold voltage limit, which is supplied to an input prong of the comparators 42.

As such, a resistor 48 may be placed in parallel with the comparators 44 of FIG. 2 to determine the basement reference voltage. A preferred basement threshold voltage may correspond to around 2.75 volts. Should a comparator 44 register that the measured voltage of an individual lithium-ion cell 14 falls below the basement threshold voltage, that comparator 44 will accordingly generate a low voltage signal.

In response to the same, the comparator 44 will disable a third switchable transistor 52 leading to the output terminals 31, 33 and to the load 30. Significantly, the transistor 52 acts as a switch enabling discharge of voltage from the lithium-ion cells 14 to the load 30. When the transistor 52 is thus disengaged, the load 30 may no longer drain voltage across the cells 14. No longer competing with discharge operations, the cells 14 may uniformly recharge via the enabled charging transistors 36, 38. More particularly, current can flow from the input ports 22, 24 to the lithium-ion cells 14 through the controller 32 and charging transistors 36, 38, ultimately arriving at the battery terminals 26, 28.

As discussed herein, the battery charger and charge control system 12 simultaneously accommodates both charge and discharge operations during normal use. That is, the controller 32 may continue to allow power to be relayed to the lithium-ion cells 14 so long as the voltage across each cell remains above the basement threshold voltage. Thus, the lithium-ion cells 14 may charge irrespective of load 30 requirements when operating within the preset voltage boundaries. Conversely, requirements of the load 30 do not impede charging operations. The controller 32 may continue to broker voltage and current from the power supply terminals 22, 24 to the lithium-ion cells 14 so long as voltage across any one cell 14 does not exceed the maximum, ceiling threshold voltage limit.

In addition to monitoring voltage across the lithium-ion cells 14, the exemplary charger and charge control system 12 may further be sensitive to high temperature conditions present in the battery housing 15. Unaddressed, such conditions can impede system performance and cause damage to electrical components. For instance, heat accumulation will lower the conductivity of wiring within the charger and charge control system 12 by increasing resistive characteristics of the same. This increased resistance translates into the generation of still more heat. Although the charger and charge control system 12 is optimized to dissipate relatively small quantities of heat, provisions are nonetheless made for instances where voltage within the housing 15 may cause the temperature within the cells 14 to rise to an unacceptable level. Consequently, the charger and charge control system 12 shown in the embodiment of FIG. 2 provides mechanisms adapted to both detect and correct such potentially harmful conditions.

Namely, a negative temperature coefficient thermistor 54 imbedded with in the battery housing 15 converts ambient temperature detected within the housing into an electrical signal. As shown in FIG. 2, comparator 56 evaluates the electrical signal from the thermistor 54 with regard to a reference temperature voltage. The reference voltage preferably correlates to around 55° C. Such an ambient temperature condition approaches a temperature mark that could become critical if allowed to further escalate. That is, an internal temperature associated with the comparator 56 will transmit an alerting signal to the controller 32 in response to the electrical signal from the thermistor 54 corresponding to the reference temperature voltage.

In response to the alerting signal, the controller 32 disables one of the switchable transistors 36 or 38 as above to disconnect the input terminals 22, 24 from the lithium-ion cells 14. In the absence of a charging voltage, temperature within the housing 15 will dissipate until the thermistor 54 registers an ambient temperature of approximately 50° C. At that instant, the hysteresis set by resistor 58 will cause the temperature comparator 56 to generate a signal configured to prompt the controller 32 to re-engage the disabled switchable transistor 36 or 38. Because heat within the housing returned to a moderate level, the charger and charge control system 12 may resume charging the cells 14 in a safe manner. Thus, the controller 32 may disconnect the charging circuit in response to either a high temperature or a high voltage condition. Such precaution translates into longer cell life and improved system performance.

As discussed herein, typical lithium-ion cells 14 perform optimally in dual modes. Namely, lithium-ion cells 14 conventionally operate in both constant voltage and constant current modes for electrochemical considerations. For instance, such dual mode operation improves cell life and performance characteristics over time. To this end, the controller 32 may accordingly be preconfigured to manage dual operating modes. As such, the controller 32 causes a constant flow of current to initially charge the lithium-ion cells 14 until the controller 32 senses that they have become fully charged. More particularly, as the lithium-ion cells 14 approach full charge, current drawn from the power source 20 will dwindle. The diminished flow of current registers with the resister 59, and in turn, the controller 32. That is, the controller 32 measures current across a resistor 59 to determine when the lithium-ion cells 14 draw less than some preset amperage. An exemplary measurement preferably corresponds to 300 milliamps of current.

In response to calculating the low current condition, the controller 32 may illuminate a green component 61 of an LED 62. In this manner, the LED 62 communicates to an operator that the lithium-ion cells 14 are filly charged without the user having to perform a labor intensive disassembly or testing procedure. Similarly, the controller 32 may illuminate a yellow component 63 of the LED 62 while greater quantities of current flow through the resister 59 in order to indicate that the lithium-ion cells 14 are charging normally. As may be appreciated, the dual signal LED 62 may be substituted with multiple LED's, sound signals, computer network transmissions, or any notification sequence/mechanism appropriate to a given application.

In anticipation of operating in constant voltage mode, the charging algorithm of the controller 32 may continuously measure voltage across the inductor 34. When a preset value, preferably around 16.8 volts, registers across the inductor 34, the controller 32 manipulates the duty cycles of the switchable transistors 36, 38 to supply constant voltage to the BAT+ and BAT− terminals 26, 28. In this manner, the controller 32 may switch to voltage mode whenever voltage measured across the inductor 34 reaches around 16.8 volts. As such, the controller 32 will continue to maintain a constant voltage across the lithium-ion cells 14 absent an interruption in power.

Figure 3:
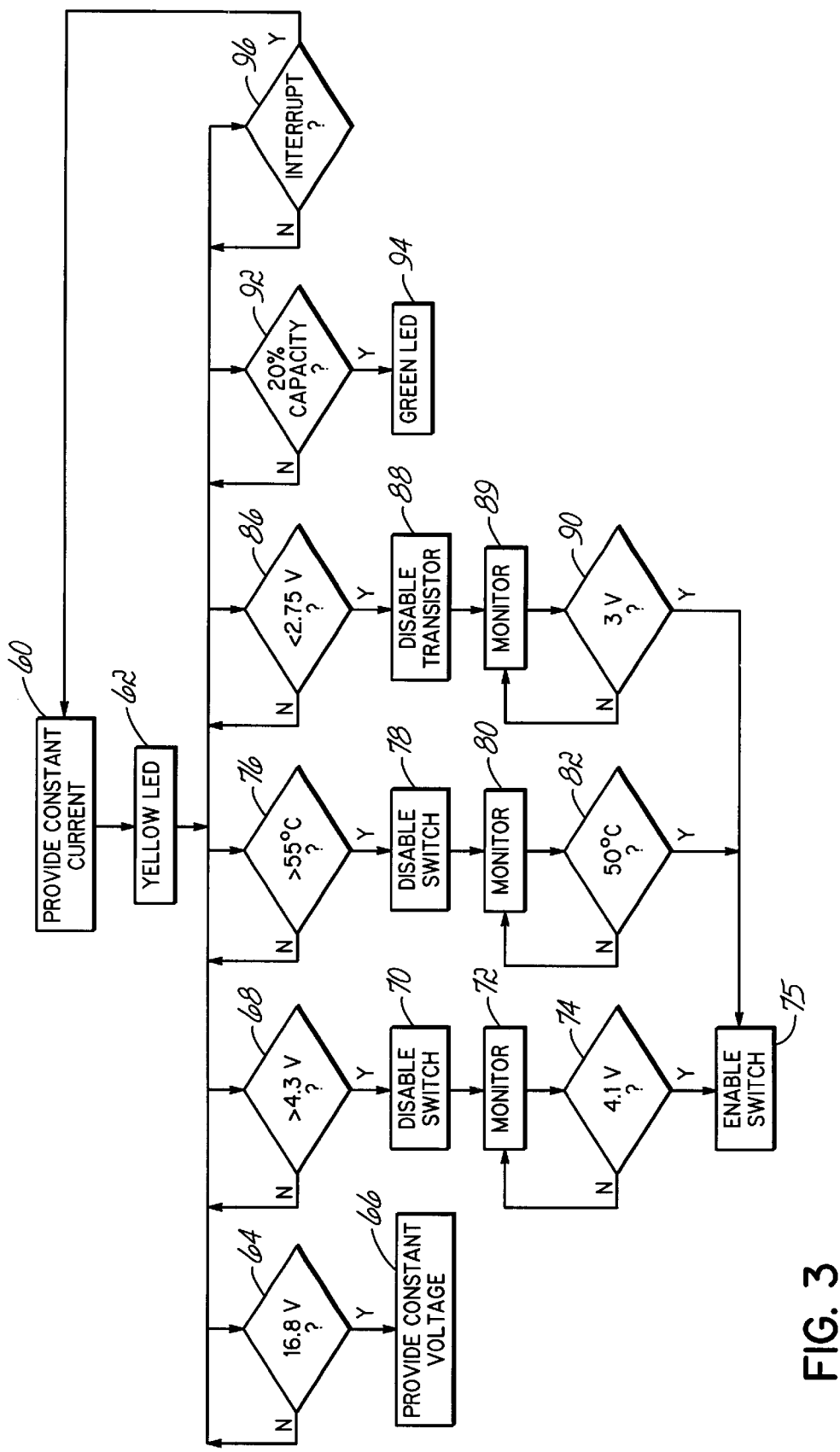
FIG. 3 illustrates a flowchart having exemplary process steps performed by the battery charger and charging control system of FIG. 1.

The flowchart of FIG. 3 illustrates exemplary steps suited to charge four lithium-ion cells 14 with an input voltage in the range of about 4.1 to about 4.5 volts per cell. As discussed in connection with FIG. 2, the illustrative method steps are preferably executed by the charger and charge control system 12 operating within the confines of a single battery housing 15. As shown in FIG. 3, an exemplary charging sequence begins at block 60 in constant current mode. As discussed herein, the controller 32 is preferably preconfigured to charge in either constant current or voltage mode according to the operational state of the cells 14. The controller 32 operates in both current and voltage modes to realize electrochemical efficiencies particular to lithium-ion cells 14.

As such, the controller 32 initiates a charge supply to the lithium-ion cells 14 while in constant current mode in response to detecting a voltage across the inductor 34 of FIG. 2. More specifically, the controller 32 performs a soft start at block 60 of FIG. 3. The controller 32 initially ramps up current to the lithium-ion cells 14 when a charge across the inductor 34 reaches approximately 8.3 volts. When the controller 32 subsequently senses around 13 volts across the inductor 34, it provides a constant current level of about 1.5 amps at block 60. To apprize a user of the charging status, the controller 32 will initiate the illumination of a yellow LED 62 at block 62.

To ensure efficient and harmonious charge and discharge operation, the controller 32 and associated circuitry will monitor for several conditions at blocks 64, 68, 76, 86, 92 and 96. While in constant current mode, one such condition includes sensing a second voltage measurement across the inductor 34 at block 64. Namely, the controller 32 will determine if the voltage across the inductor 34 has achieved a transition voltage of about 16.8 volts. If so, the embodiment will accordingly adjust operating mode to constant voltage operation at block 66. As such, the controller 32 will provide a charge sufficient to maintain a constant voltage of around 16.8 volts across the cells 14.

While operating in either mode, control circuitry simultaneously measures the voltage across each individual lithium-ion cell as shown at block 68 of FIG. 3. As discussed above, comparators 42, 44 work in conjunction with differential amplifiers 40 to report the voltage across each cell to the controller 32. Should the controller 32 receive a signal from a comparator indicating that the voltage across one such cell exceeds around 4.3 volts at block 68, then the controller 32 will break a switchable transistor connection at block 70. By disabling the switchable transistor at block 70, current is diverted away from the lithium-ion cells 14. This feature enables the voltage across the critical lithium-ion cell to dissipate.

As such, the controller 32 may continue to monitor the voltage across the cell at block 72. Should it determine that the voltage across the cell has diminished to about 4.1 volts at block 74, then the controller 32 will reenable the switchable transistor at block 75. The switchable transistor will again complete the circuit from the controller 32 to the lithium-ion cells 14. Consequently, the controller 32 resumes charging operations as before. In this manner, the controller 32 manipulates the duty cycles of the switchable transistors 36, 38 to control voltage across the lithium-ion cells 14. Of note, the controller 32 and sensing circuitry of the embodiment provide a measure of hysteresis between blocks 70 and 75, in that voltage preferably decays about 200 milliamps before the switchable transistor is again enabled. This feature prevents oscillations that could otherwise hinder charging performance and potentially damage hardware over time.

At block 76, the controller 32 further monitors ambient temperature conditions within the lithium-ion battery housing 15. Namely, a thermistor 54 buried within the housing 15 transmits an electrical signal to the controller 32 should the temperature within the housing 15 exceed a preferable setting of about 55° C. In response to receiving the signal generated at block 76, the controller 32 will break the switchable transistors 36, 38 as above at block 78. This action of disabling the switchable transistor will allow voltage and subsequently, the heat within the housing 15 to dissipate while the charging circuit remains broken.

At block 80, the controller 32 will monitor signals from the thermistor 54 until the temperature within the housing 15 preferably registers at around 50° C. at block 82. A 50° C. measurement will cause the controller 32 to re-engage the disabled switchable transistor at block 75. After bridging the approximately five degrees of hysteresis provided by the charging regiment, charging operations resume as before the temperature occurrence.

As discussed herein, circuitry of the embodiment shown in FIG. 3 allows for the simultaneous charge and discharge of the lithium-ion cells 14. To this end, the controller 32 additionally monitors a minimum or basement threshold voltage across each lithium-ion cell at block 86. For instance, the differential amplifier/comparator combination may report to the controller 32 that cell voltage across a single lithium-ion cell has fallen below a preferable setting of around 2.75 volts. If so, the controller 32 may disconnect the load 30 at block 88. More particularly, a switchable transistor in series with the load 30 will be disabled at block 88 in response to a low voltage signal from a comparator.

With the load 30 thus disconnected, voltage within the lithium-ion cell will re-accumulate, unburdened by charge supply operations. The controller 32, in conjunction with the amplifiers 40 and comparators 42, 44, will continue to monitor voltage across the critical cell at block 89 until its associated voltage recovers to around three volts. Once voltage in the cell has recovered as such at block 90, then the controller 32 will resume power supply to the load 30 by re-engaging the disabled transistor at block 75. The exemplary three volt recovery is preferably set such that the critical cell has achieved a charge sufficient to avoid oscillations associated with inadequate hysteresis as discussed above.

Alternatively at block 86, should the measured voltage integrity across each of the lithium-ion cells 14 remain above around 2.75 volts, then the controller 32 will continue charging the lithium-ion cells 14 until current consumed by the cells 14 diminishes to a measurement of approximately 20% of their maximum draw at block 92. In response, the controller 32 will illuminate a green LED 62 at block 94 to indicate fall charge to the user. Of note, should the power source 20 be interrupted at any time during operation and as shown in block 96, the embodiment will resume charging in constant current mode at block 60.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative battery system and method, and illustrative example shown and described. Accordingly, departures may be made from such details without departing from the spirit or scope of applicant's general inventive concept.

What is claimed is:

1. A battery system for charging a plurality of lithium-ion cells, comprising:
   charging circuitry adapted to be coupled to said plurality of lithium-ion cells and configured to supply a charge to said plurality of lithium-ion cells to charge each of the plurality of lithium-ion cells to a voltage in a range of about 4.1 volts to about 4.3 volts with a voltage input to the charging circuitry in a range of about 4.1 volts to about 4.5 volts per lithium-ion cell; and
   charge control circuitry coupled to the charging circuitry and operable to manage operation of the charging circuitry.

2. The battery system of claim 1, wherein the charging and charge control circuitry mount onto a single board.

3. The battery system of claim 1, wherein the charging and charge control circuitry are contained within a housing adapted to house the plurality of lithium-ion cells.

4. The battery system of claim 1, wherein the charging and charge control circuitry is operable to charge the plurality of lithium-ion cells and enable the plurality of lithium-ion cells to discharge into a load.

5. The battery system according to claim 1, wherein the charge control circuitry is operable to activate an indicator to communicate a charging status of the plurality of lithium-ion cells.

6. The battery system according to claim 1, wherein the charge control circuitry is operable to measure a voltage across a lithium-ion cell of the plurality of lithium-ion cells.

7. The battery system according to claim 6, wherein the charge control circuitry is operable to disconnect the charging circuitry from the lithium-ion cell in response to detecting a ceiling threshold voltage across the lithium-ion cell.

8. The battery system according to claim 7, wherein the ceiling threshold voltage is about 4.3V.

9. The battery system according to claim 7, wherein the charging circuitry includes a switchable transistor configured to disconnect at least the lithium-ion cell from the charging circuitry, wherein the charge control circuitry controls the operation of the switchable transistor.

10. The battery system according to claim 6, wherein the charge control circuitry is operable to connect the charging circuitry to at least the lithium-ion cell in response to detecting a hysterisis voltage across the lithium-ion cell.

11. The battery system according to claim 10, wherein the hysterisis voltage is about 4.1V.

12. The battery system according to claim 6, wherein the charge control circuitry is operable to disconnect a load from at least the lithium-ion cell in response to detecting a basement threshold voltage across the lithium-ion cell.

13. The battery system according to claim 12, wherein the basement threshold voltage is about 2.75V.

14. The battery system according to claim 6, wherein the charge control circuitry is operable to reconnect the load to the lithium-ion cell in response to detecting a recovery voltage across the lithium-ion cell.

15. The battery system according to claim 14, wherein the recovery voltage is about 3V.

16. The battery system according to claim 1, wherein the charge control circuitry is operable to disconnect the charging circuitry from the plurality of lithium-ion cells in response to detecting a reference temperature proximate at least one of the plurality of lithium-ion cells.

17. The battery system according to claim 16, wherein the reference temperature is about 55° C.

18. The battery system according to claim 1, wherein the charge control circuitry is operable to reconnect the charging circuitry to the plurality of lithium-ion cells in response to detecting a resume temperature.

19. The battery system according to claim 1, wherein the charge control circuitry is operable to provide a constant current to the plurality of lithium-ion cells in response to a charging interruption.

20. The battery system according to claim 1, wherein the charge control circuitry is operable to provide a constant voltage charge to the plurality of lithium-ion cells while the plurality of lithium-ion cells are charging.

21. A battery system, comprising:
   a battery housing configured to house at least one lithium-ion cell;
   charging circuitry positioned within the battery housing and operable to supply a charge to the lithium-ion cell;
   charge control circuitry positioned within the battery housing and being electronically coupled to the charging circuitry to manage operation of the charging circuitry.

22. The battery system of claim 21, wherein the charging and control circuitry mount onto a single board.

23. The battery system of claim 21, wherein the charging and charge control circuitry is operable to charge the plurality of lithium-ion cells and enable the plurality of lithium-ion cells to discharge into a load.

24. The battery system according to claim 21, wherein the control circuitry is operable to activate an indicator to communicate a charging status of the lithium-ion cell.

25. The battery system according to claim 21, wherein the control circuitry is operable to measure a voltage across the lithium-ion cell.

26. The battery system according to claim 21, wherein the control circuitry is operable to disconnect the charging circuitry from at least the lithium-ion cell in response to detecting a ceiling threshold voltage across the lithium-ion cell.

27. The battery system according to claim 21, wherein the control circuitry is operable to disconnect a load from at least the lithium-ion cell in response to detecting a basement threshold voltage across the lithium-ion cell.

28. The battery system according to claim 27, wherein the basement threshold voltage is about 2.75V.

29. The battery system according to claim 21, wherein the charge control circuitry is operable to reconnect a load to at least the lithium-ion cell in response to detecting a recovery voltage across the lithium-ion cell.

30. The battery system according to claim 21, wherein the control circuitry is operable to disconnect the charging circuitry from at least the lithium-ion cell in response to detecting a reference temperature proximate the lithium-ion cell.

31. The battery system according to claim 30, wherein the reference temperature is about 55° C.

32. The battery system according to claim 21, wherein the charge control circuitry is operable to reconnect the charging circuitry to at least the lithium-ion cell in response to detecting a resume temperature.

33. A method of charging a plurality of lithium-ion cells having circuitry adapted to be coupled to and supply power to a plurality of lithium-ion cells, comprising charging each of the plurality of lithium-ion cells to a voltage in a range of about 4.1 volts and about 4.3 volts with a voltage input to the circuitry in a range of about 4.1 volts and about 4.5 volts per each lithium-ion cell of the plurality of lithium-ion cells.

34. The method according to claim 33, further comprising mounting the circuitry within a battery housing containing at least one lithium-ion cell of the plurality of lithium-ion cells, wherein the circuitry comprises charging and charge control circuitry.

35. The method of claim 34, further comprising mounting the charging and charge control circuitry onto a single board.

36. The method of claim 33, further comprising simultaneously charging and discharging the plurality of lithium-ion cells.

37. The method according to claim 33, further comprising activating an indicator to communicate a charging status of the plurality of lithium-ion cells.

38. The method according to claim 33, further comprising sensing a current flow into the plurality of lithium-ion cells.

39. The method according to claim 33, further comprising disconnecting the charging circuitry from the plurality of lithium-ion cells in response to detecting a ceiling threshold voltage across a lithium-ion cell of the plurality of lithium-ion cells.

40. The method according to claim 33, further comprising connecting the charging circuitry to the plurality of lithium-ion cells in response to detecting a hysterisis voltage across a lithium-ion cell of the plurality of lithium-ion cells.

41. The method according to claim 33, further comprising disconnecting a load from the plurality of lithium-ion batteries in response to detecting a basement threshold voltage across a lithium-ion cell of the plurality of lithium-ion cells.

42. The method according to claim 33, further comprising reconnecting the load to the plurality of lithium-ion batteries in response to detecting a recovery voltage across a lithium-ion cell of the plurality of lithium-ion cells.

43. The method according to claim 33, further comprising disconnecting the charging circuitry from the plurality of lithium-ion cells in response to detecting a reference temperature.

44. A method of charging at least one lithium-ion cell housed within a battery housing, the lithium-ion cell being supplied charge from charging circuitry, wherein operation of the charging circuitry is managed by charge control circuitry, comprising:

positioning the charging circuitry within the battery housing such that the charging circuitry operatively couples to the lithium-ion cell; and locating the charge control circuitry within the battery housing such that the charge control circuitry electrically couples to the charging circuitry.

45. The method of claim 44, further comprising mounting the charging and charge control circuitry onto a single board.

46. The method of claim 44, further comprising simultaneously charging and discharging the lithium-ion cell.

47. The method according to claim 44, further comprising activating an indicator to communicate a charging status of the lithium-ion cell.

48. The method according to claim 44, further comprising disconnecting the charging circuitry from the lithium-ion cell in response to detecting a ceiling threshold voltage across the lithium-ion cell.

49. The method according to claim 44, further comprising connecting the charging circuitry to the lithium-ion cell in response to detecting a hysterisis voltage across the lithium-ion cell.

50. The method according to claim 44, further comprising disconnecting a load from the lithium-ion cell in response to sensing a basement threshold voltage across the lithium-ion cell.

51. The method according to claim 44, further comprising disconnecting the charging circuitry from the lithium-ion cell in response to detecting a reference temperature proximate the lithium-ion cell.

* * * * *